US006698408B2

(12) United States Patent
McConnell

(10) Patent No.: US 6,698,408 B2
(45) Date of Patent: Mar. 2, 2004

(54) POSITION CONTROL STRATEGY EGR VALVE ACTUATOR

(75) Inventor: Jason J. McConnell, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 64 days.

(21) Appl. No.: 10/192,871

(22) Filed: Jul. 10, 2002

(65) Prior Publication Data

US 2004/0007221 A1 Jan. 15, 2004

(51) Int. Cl.[7] .......................... F02M 25/07; F16K 31/02

(52) U.S. Cl. .............................. 123/568.21; 251/129.15

(58) Field of Search ......................... 123/90.11, 568.21, 123/568.22, 568.26, 568.27, 568.28; 251/129.01, 129.15, 129.16

(56) References Cited

U.S. PATENT DOCUMENTS

| | | | | |
|---|---|---|---|---|
| 4,071,003 | A | 1/1978 | Aono | 123/568.21 |
| 4,233,947 | A | 11/1980 | Abo | 123/568.21 |
| 4,242,728 | A | 12/1980 | Hartford | 701/112 |
| 4,694,812 | A | 9/1987 | Wendt | 123/568.27 |
| 5,482,020 | A | 1/1996 | Shimizu et al. | 123/406.47 |
| 5,520,161 | A | 5/1996 | Klopp | 123/676 |
| 5,666,931 | A | 9/1997 | Pierik et al. | 123/568.21 |
| 5,666,932 | A | 9/1997 | Bauerle et al. | 123/568.21 |
| 5,921,224 | A | 7/1999 | Sinnamon | 123/568.21 |
| 6,112,729 | A * | 9/2000 | Barnes et al. | 123/568.21 |
| 6,340,007 | B2 * | 1/2002 | Di Lieto et al. | 123/90.11 |
| 6,467,469 | B2 * | 10/2002 | Yang et al. | 123/568.21 |
| 6,494,172 | B2 * | 12/2002 | Komatsu et al. | 123/90.11 |
| 6,497,205 | B2 * | 12/2002 | Kumaki et al. | 123/90.11 |
| 6,588,385 | B2 * | 7/2003 | Fuwa | 123/90.11 |
| 2002/0134956 | A1 * | 9/2002 | Smith et al. | 251/129.15 |

* cited by examiner

*Primary Examiner*—Willis R. Wolfe
(74) *Attorney, Agent, or Firm*—L. J. Kasper

(57) ABSTRACT

A method of controlling exhaust gas recirculation by means of an EGR valve (55). An electromagnetic actuator (41) is associated with a housing (47) to transmit movement of an actuator output (75) into reciprocating movement of the EGR valve in response to changes in an electrical input signal (95), and the method comprises generating (93) a compensator gain value to modify the electrical input signal (95). The improved method provides a valve position sensor (79) and generates a position signal (97) representing instantaneous valve position. The next step is storing (105) a first relationship ($DC_{THLD}$) of the electrical input signal (95) required to change the instantaneous valve position, then, during ongoing operation, generating (105) a then-current, second relationship (DC) of the electrical input signal (95) required to change the instantaneous valve position. Next is comparing (105) the second relationship (DC) to the first ($DC_{THLD}$) and generating (111) a corresponding difference factor, then using (111) that difference factor to modify (93) the compensator gain value correspondingly. This method enables the system to adapt to changes in system friction.

2 Claims, 4 Drawing Sheets

POSITION CONTROL STRATEGY EGR VALVE ACTUATOR

BACKGROUND OF THE DISCLOSURE

The present invention relates to an exhaust gas recirculation (EGR) system for controlling the flow of exhaust gas from an exhaust gas manifold to an intake manifold of an internal combustion engine, and more particularly, to an improved method for controlling such an EGR system.

Although the use of the present invention is not limited to any particular type or configuration of engine, its use is especially advantageous in connection with a heavy duty diesel engine, and the invention will be described in connection therewith. Furthermore, although the present invention may be utilized advantageously in connection with the control of various engine elements, such as electromagnetically-operated engine poppet valves on camless engines, and control rods for VGT (variable geometry turbine) systems, the invention is especially advantageous when utilized in connection with an EGR system, and will be described in connection therewith.

EGR systems are utilized in automotive vehicles (i.e., including both passenger cars and trucks) in order to help reduce engine emissions, and are desirable especially on heavy duty diesel engines. Such EGR systems typically utilize an EGR poppet valve that is disposed between the engine exhaust manifold and the engine intake manifold. The EGR poppet valve is operable, when in an open position, to permit recirculation of exhaust gas from the exhaust manifold back into the intake manifold. As is well know to those skilled in the art, such recirculation of exhaust gasses is helpful in reducing various engine emissions. As is also well known to those skilled in the art, when the engine is operating under relatively heavy torque loads (such as while accelerating or shifting gears at low speeds), the EGR valve will typically be closed, or nearly closed, whereas, when the engine is operating under relatively lighter torque loads (such as at steady state engine speed, in a higher gear ratio), the EGR valve will typically be fully open, or almost fully open.

An electromagnetic actuator is preferably employed for moving the EGR poppet valve between its open and closed positions, because the recirculation of exhaust gasses is appropriate and helpful only at certain times during the operation of the engine, in accordance with the previous discussion, and it is desirable to be able to change the position of the EGR poppet valve very quickly to adjust to varying vehicle and engine operating conditions. EGR valves of the type with which the present invention may be utilized are illustrated and described in U.S. Pat. Nos. 5,937,835 and 6,102,016, both of which are assigned to the assignee of the present invention and are incorporated herein by reference.

Electrically actuated EGR valve systems preferably utilize software-implemented control logic, such that the EGR poppet valve is operating under closed loop control when the EGR poppet valve is being moved from a closed position to an open position, and when it is being moved from an open position to a closed position. As used herein, the term "closed loop" in regard to the control of the EGR poppet valve will be understood to mean that the control logic is constantly "reading" the position of the valve, and utilizing the resulting position signal as part of the feedback to the control logic. The closed loop control logic controls electric current to an electric motor which serves as the actuator to move the EGR poppet valve, and control the opening/closing position thereof. In such systems, the control logic typically generates pulse width modulated (PWM) signals to power the actuator motor, and modulate the movement of the EGR poppet valve, moving it from one position to another.

As is also well know to those skilled in the art of position control using DC motors, it is not sufficient, when designing the control logic for an engine component such as an EGR poppet valve, to merely establish a baseline relationship of EGR poppet valve position as a function of control current, and thereafter assume that the position-versus-current relationship will remain constant (i.e., equal to the baseline relationship). For example, it is now well know to those skilled in the art of controlling electrically actuated devices to adjust the gain compensation within the control circuit as a function of the ambient temperature of the device being controlled. In the course of developing the commercial embodiment of an EGR poppet valve system of the type to which the present invention relates, the assignee of the present invention has taken into account the typical, well known system variables (e.g., fluctuations in system voltage, ambient temperature, etc.), and has built into the EGR system control logic the appropriate compensation for variations in such factors. However, it has been observed by the assignee of the present invention that there have still been aspects of the overall EGR system performance, on the developmental systems, which have not been fully acceptable.

As a result of the development of the present invention, it has been observed by the inventor of the present invention that the performance of the EGR system can change substantially, over a relatively short period of time, especially when the EGR system is operating under conditions such that the EGR poppet valve remains open during a major portion of a given time period. It has now been determined that at least one likely cause of such changes in the performance of the EGR system relates to the system "friction", and especially, the static friction (i.e., the friction when the system is not moving) which must be overcome to achieve initial movement of the poppet valve. The friction being referred to hereinabove would include that in the gear train or drive train between the electromagnetic actuator (motor) and the poppet valve, as well as that associated with the engagement of the poppet valve stem and the bore in which the stem reciprocates. In some EGR systems, there may also be seals, or other elements which provide a frictional "drag" which resists movement of the poppet valve.

Unfortunately, it has now been determined that, not only does the system have to overcome the static friction in order to begin to move the EGR poppet valve, but also, the total amount of the static friction which must be overcome can change substantially. It is now believed that a major cause of the changing static friction is the exhaust gas soot, and the various other contaminants from the EGR gas (all of which are hereinafter, for simplicity, collectively referred to as "soot"), which build up at various locations, such as on the valve stem. If the EGR poppet valve remains open for an extended period of time, such as an hour, there may be enough of a build-up of soot to change the static friction of the system by 20 or 30 percent, or more, thus requiring substantially more electric power than usual to overcome the friction and achieve initial movement of the EGR poppet valve.

However, as a further complication in attempting to compensate for the build-up of soot, and the resulting increase in the static coefficient of friction ("COF"), it is also known that during operation of the vehicle engine, the built-up soot can get burned-off, thus decreasing the static COF. In other words, the static COF goes up and down, as a function of the driving cycle. Furthermore, when the static COF is relatively high (because of soot as explained previously) and the difference between the static COF and the dynamic COF (i.e., when the system is moving) becomes fairly large, controlling accurately the movement of the EGR valve becomes even more difficult, as there is a tendency for the valve to "overshoot" its commanded position. This is true because a relatively higher current is needed to overcome the static friction, and get the valve moving, but then the current to the motor is excessive, once the valve begins to move, in view of the much lower dynamic COF . The overshoot problem typically means that it takes a longer time to get the EGR valve to the desired position, which may result in more exhaust gas being released than was intended. Also, in the event of overshoot of the EGR valve position, there can be unintentional engagements with mechanical stops which comprise part of the system, causing excessive wear and reducing the durability of the EGR assembly.

BRIEF SUMMARY OF THE INVENTION

Accordingly, it is an object of the present invention to provide an improved control member system, and an improved method for controlling such a system, which achieves a greater consistency and predictability in the operating performance of the system.

It is a more specific object of the present invention to provide such an improved method of controlling an EGR valve system which substantially eliminates one of the major sources of variation in overall system performance.

It is another object of the present invention to provide an improved method of controlling such a system, which accomplishes the above-stated objects by compensating for variations in system friction over a period of time.

The above and other objects of the invention are accomplished by the provision of an improved method of controlling the movement of an assembly in an internal combustion engine. The assembly includes a control member moveable between a closed position, blocking communication from a first engine gas passage to a second engine gas passage, and an open position. The assembly further includes housing means, the control member being disposed within the housing means for reciprocable movement therein. An electromagnetic actuator operably associated with the housing means has an actuator output. A drive train is operable to transmit movement of the actuator output into reciprocating movement of the control member in response to changes in an electrical input signal, the method of controlling the movement comprising the steps of generating a compensator gain value to modify the electrical input signal.

The improved method of controlling the movement is characterized by providing a position sensor operable to sense a position of the control member and generate a position signal representing instantaneous control member position. The next step is storing a first relationship of the electrical input signal required to change the instantaneous control member position. During ongoing operation of the internal combustion engine, the next step is generating a then-current, second relationship of the electrical input signal required to change the instantaneous control member position. Next, the method compares the second relationship to the first relationship and generates a corresponding difference factor, and uses that factor to modify the compensator gain value correspondingly.

DETAILED DESCRIPTION OF THE PREFERRED EMBODIMENT

Figure 1:
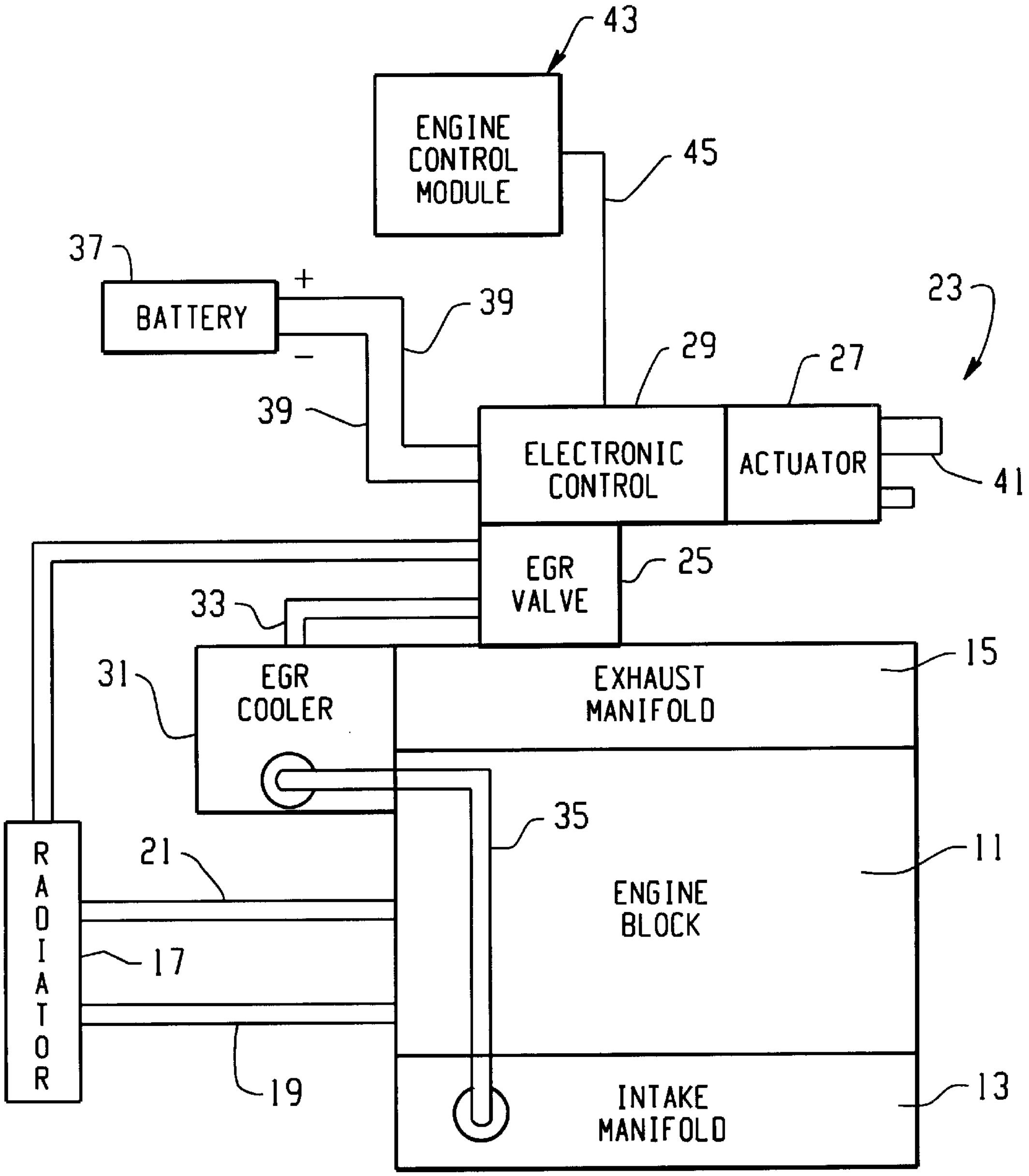
FIG. 1 is a schematic view of a diesel engine including an exhaust gas recirculation (EGR) system of the type with which the control method of the present invention may be utilized.

Referring now to the drawings, which are not intended to limit the invention, FIG. 1 is a schematic of a vehicle internal combustion engine, and more specifically, of a heavy duty diesel engine. As is shown schematically in FIG. 1, the diesel engine includes an engine block 11, an intake manifold 13, and an exhaust manifold 15. Disposed forwardly of the engine block 11 is an engine radiator 17, by means of which engine coolant flowing through the engine block 11 may be cooled. As is well know to those skilled in the art, the radiator 17 would typically be connected to the engine block 11 by means of a pair of hoses or conduits 19 and 21.

Associated with the exhaust manifold 15 is an EGR valve assembly, generally designated 23. The assembly 23 includes an EGR valve portion 25, an EGR valve actuator portion 27, and an actuator electronic control portion 29. Associated with the engine block 11 is an EGR cooler 31, the function of which is to cool the relatively hot exhaust gasses which are communicated from the EGR valve assembly 23 to the intake manifold 13. In order to accomplish this cooling of the exhaust gasses, the EGR valve portion 25 is connected by means of a duct or pipe 33 to the cooler 31, and exhaust gasses passing through the cooler 31 then flow through a duct or pipe 35 to the intake manifold 13, the details of which are not essential to the present invention and which, therefore, will not be described further herein.

The vehicle includes a battery 37 which is connected by means of a pair of electrical leads 39 to the actuator electronic control portion 29, thus providing the electrical power for an electric motor 41, which comprises part of the EGR valve actuator portion 27. It should be understood that the present invention is not limited to any particular type or configuration of electric motor, for reasons which will become apparent subsequently, and within the scope of the present invention, various other forms of an electromagnetic actuator could be utilized. The vehicle is also provided with a fairly conventional engine control module (ECM), generally designated 43.

The ECM 43 receives input from the electronic control portion 29 (such as a signal representative of instantaneous EGR valve position), and provides appropriate command signals to the electronic control portion 29 (such as a PWM signal representative of the desired EGR valve position) by means of a data link 45. Although FIG. 1 schematically illustrates the electronic control portion 29 and the ECM 43 as separate components/sub-systems, it should be apparent to those skilled in the vehicle electronic control art that the portion 29 would likely be included within the ECM 43. Hereinafter, the command signal from the ECM 43 is also referred to by the designation "45". The data link 45 is also used to send/receive information for diagnostic purposes, for example, to comply with various OBD (on-board-diagnostics) regulations.

Figure 2:
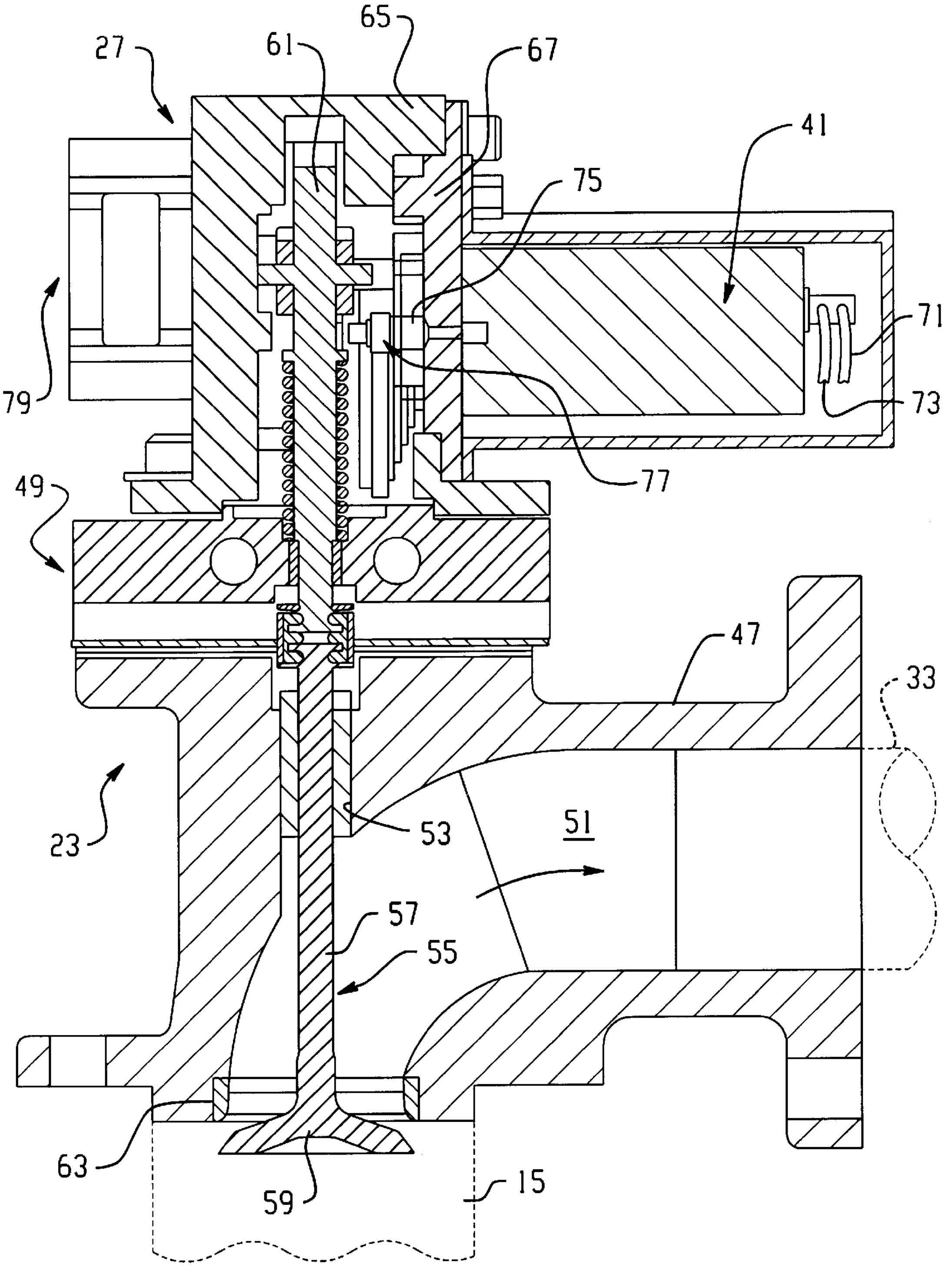
FIG. 2 is a transverse cross section of the exhaust gas recirculation valve and control system, shown schematically in FIG. 1.

Referring now primarily to FIG. 2, the EGR valve assembly 23 is shown in some detail. The assembly 23 includes a manifold mounting portion 47, a heat transfer (cooling) portion 49, and the valve actuator portion 27. The manifold mounting portion 47 defines a flow passage 51, and at the upstream end thereof, the portion 47 and the flow passage 51 are connected to the exhaust manifold 15 (shown schematically in FIG. 2). At the downstream end of the flow passage 51 the manifold mounting portion 47 is connected to the duct 33, such that the exhaust gases may eventually flow to the intake manifold 13.

The manifold mounting portion 47 also defines a bore 53 within which an EGR valve, generally designated 55, is reciprocally supported for axial movement therein. The EGR valve 55 includes a valve stem 57 that is integrally formed with a poppet valve portion 59, and an input stem portion 61 that is coupled to the valve stem 57 by any suitable coupling means, such that the input stem portion 61 and the valve stem 57 have common axial movement. It should be understood, however, that the configuration of the EGR valve 55 as just described is not an essential feature of the invention, and various other poppet valve configurations could be utilized within the scope of the present invention. The manifold mounting portion 47 further includes a valve seat 63 against which the poppet valve portion 49 seats or engages when the EGR valve 55 is closed. It should be noted that in FIG. 2, the EGR valve 55 is shown in an open position. As is well known to those skilled in the EGR valve art, a typical EGR valve doesn't have just one "open" position, but instead, has a range of open positions, depending upon the then-current operating conditions of the engine.

The EGR valve actuator portion 27 includes, by way of example only, an actuator housing 65 to which is attached a housing cover 67. Attached to the exterior of the housing cover 67 is the casing of the electric motor 41. Although the particular construction and specification of the electric motor 41 are not essential features of the present invention, the motor 41 is preferably of the relatively high speed, continuously rotating type, and is preferably one with a high torque-to-inertia ratio, such as a permanent magnet DC commutator motor. As is described in greater detail below, control logic controls the functioning of the electric motor 41 by means of a pair of electrical connections 71 and 73 (not shown in the schematic of FIG. 1).

The electric motor 41 of the EGR valve actuator portion 27 provides a low torque, high speed rotary output at a motor output shaft 75 which drives a gear train, generally designated 77. The gear train 77 translates the relatively low torque, high speed rotary output of the motor 41 into a relatively high torque, low speed rotary output which is then converted by means of a linkage, not shown herein, into axial movement of the input stem portion 61, and of the EGR valve 55. However, it should be apparent to those skilled in the art that the use of the present invention is not limited to any particular configuration of EGR valve gear train or actuator, etc.

Attached to the actuator housing 65 is a sensor assembly, generally designated 79, the function of which is to sense, either directly or indirectly, the axial position of the EGR valve 55. The sensor assembly 79 converts the sensed position into an appropriate electrical signal that is transmitted as an input to the control logic in the ECM 43 (the logic to be described hereinafter), which controls the functioning of the electric motor 41. In the preferred embodiment, the sensor assembly 79 is a resistive position sensor of the type typically used in the vehicle industry for throttle position measurements.

Figure 3:
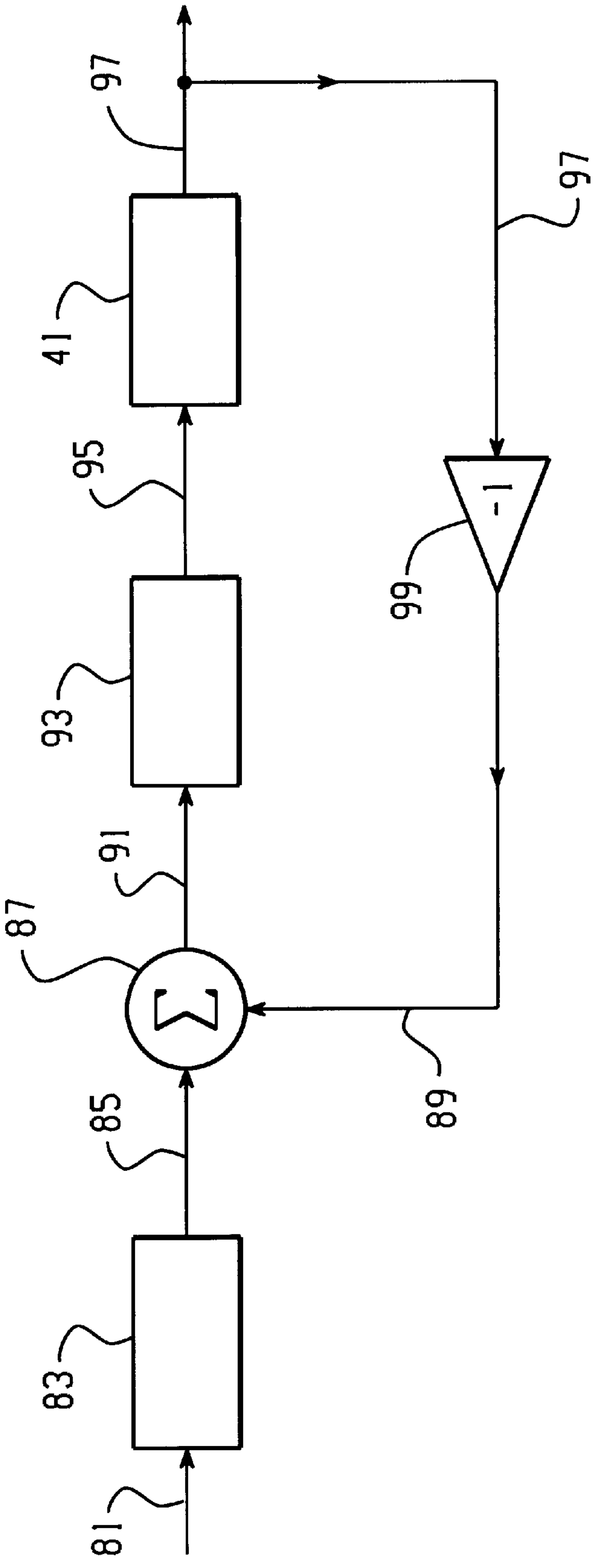
FIG. 3 is a simplified logic control diagram of the type which would be utilized to control the EGR valve and control system shown in FIGS. 1 and 2.

Referring now primarily to FIG. 3, the basic control logic utilized to provide the electrical input signal to the electric motor 41 will be described briefly. It should be understood that the control logic could take various forms, and what is illustrated and described in FIG. 3 is by way of example only.

In FIG. 3, a position command signal 81 is communicated to a pre-filter device 83, the output of the device 83 comprising a filtered command signal 85. The pre-filter device 83 functions in the manner of a low-pass filter, and provides a second degree of freedom which can be used to alter the dynamic time response of the system. The device 83 is intended to remove certain undesirable high frequency components of the position command signal 81, and especially those which are near the natural frequency of the EGR valve assembly 23. The signal 85 is communicated to a summing junction 87, the other input to which is an inverted position feedback signal 89, such that the output of the summing junction 87 comprises an error signal 91. As used herein, it will be understood that the term "error" refers to an error in the position of the EGR valve 55, i.e., the difference between the commanded position and the actual position.

The error signal 91 is communicated to a control device 93 which, by way of example only, may include the control logic (compensator and "state" machine) and an amplifier circuit. The output of the control device 93 comprises a command signal (referred to hereinafter in the appended claims as an "electrical input signal") 95 which is the actual command signal transmitted from the electronic control portion 29 to the electrical connections 71 and 73 of the electric motor 41. Typically, the command signal 95 would comprise a PWM (pulse width modulated) signal, as is well know to those skilled in the art. The command signal 95 is transmitted to the electric motor 41 which then, in response to the command signal 95, positions the EGR valve 55, in the manner described previously.

In the control logic of FIG. 3, the "output" from the element labeled "41" (the electric motor) is a valve position signal 97, which is the output signal from the sensor assembly 79, and represents actual instantaneous valve position, i.e., the actual linear position of the poppet valve portion 59 relative to the valve seat 63. The position signal 97 is fed back to an inverting amplifier 99, which merely inverts the polarity of the position signal 97 to generate the inverted position feedback signal 89, in preparation for transmitting the signal 89 to the summing junction 87.

As was mentioned in the BACKGROUND OF THE DISCLOSURE, it is well known to adjust the gain (i.e., the gain of the compensator of the control device 93) in accordance with variations in system parameters, such as system voltage and ambient temperature. However, in accordance with an important aspect of the present invention, the gain of the compensator of the control device 93 is also varied as a function of changes in a parameter to be referred to hereinafter as the system "friction number", or friction index, which comprises an arbitrary value, having no units. The friction number is representative of the instantaneous level of friction in the entire EGR valve system, i.e., all of the friction in the system which will ultimately affect the movement of the EGR valve 55. Those skilled in the art will understand that the friction number is not to be confused with the co-efficient of friction (COF) associated with any particular pair of engaging surfaces.

For purposes of the subsequent description of the invention, the focus will be on the situation in which the EGR valve 55 is moved from a closed position to a particular, commanded (desired) open position, although it will be understood by those skilled in the art that the present invention would also be applied, and in the same manner, in connection with moving the EGR valve 55 from a particular open position to either the closed position, or to a new, commanded (desired) open position which is less open than the starting position.

Figure 4:
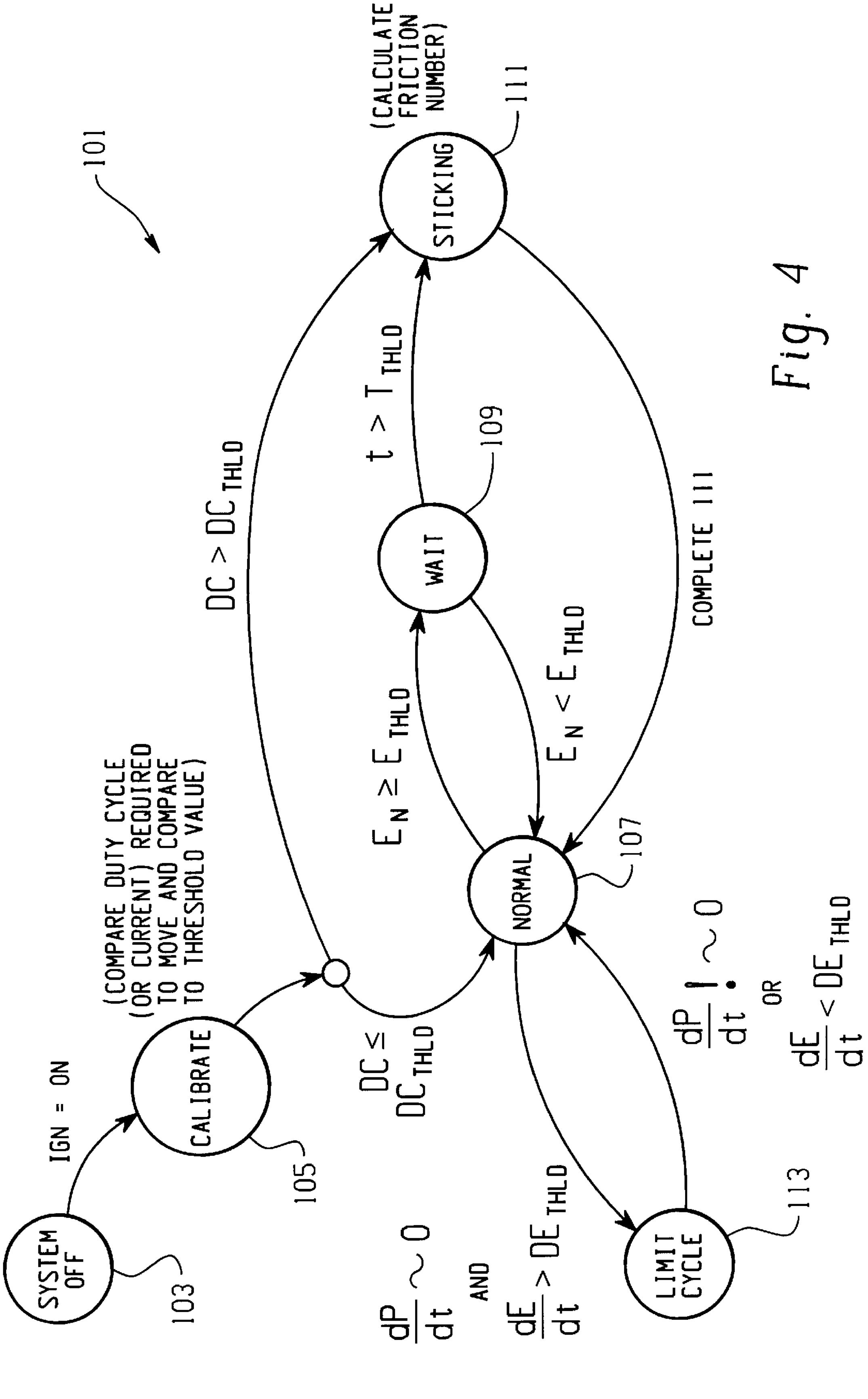
FIG. 4 is a "state" flow chart, illustrating the various states (conditions) of the control system of the present invention.

Referring now primarily to FIG. 4, there is shown a flow diagram of the system control algorithm, generally designated 101, which comprises an important aspect of the present invention. In the algorithm 101 (also referred to as a "state machine"), there are six states representative of different operating modes for the EGR valve assembly 23. The six states of the system include an OFF state 103, a CALIBRATE state 105, a NORMAL state 107, a WAIT state 109, a STICKING state 111 and a LIMIT CYCLE state 113.

In the OFF state 103, the entire system is off because the engine is not operating and the vehicle ignition and electrical system are off. The system exits the OFF state 103 whenever the vehicle ignition switch is turned "ON", and proceeds to the CALIBRATE state 105.

In the CALIBRATE state 105, the current (or duty cycle) of the command signal 95, designated "DC" in FIG. 4, which is required to change the instantaneous position of the EGR valve 55 is compared to a known threshold value, designated "$DC_{THLD}$" in FIG. 4. When that comparison is completed, the algorithm exits the CALIBRATE state 105. If the command signal 95 (DC) is greater than the threshold value $DC_{THLD}$), the system proceeds to the STICKING state 111. If the command signal 95 is less than the threshold value, the system proceeds to the NORMAL state 107.

In the NORMAL state 107, there is a continuous monitoring of the error signal 91 (see FIG. 3), designated in FIG. 4 as "E", in the general sense, but also designated at some places in FIG. 4 as "$E_N$", to indicate the instantaneous value of the error at a particular sample time. If the error signal 91 ($E_N$) is equal to or greater than a threshold value of error, designated "$E_{THLD}$" in FIG. 4, then the algorithm exits the NORMAL state 107 and goes to the WAIT state 109. In the WAIT state 109, if $E_N$ is greater than the threshold value $E_{THLD}$ for a time period "t" which is greater than a threshold time period, designated $T_{THLD}$ in FIG. 4, then the algorithm exits the WAIT state 109 and goes to the STICKING state 111. Alternatively, if at any time the instantaneous error signal $E_N$ is less than the threshold value $E_{THLD}$, the algorithm exits the WAIT state 109 and returns to the NORMAL state 107.

While the algorithm is in the NORMAL state 107, if the time derivative dP/dt of the desired position command signal (signal 81 in FIG. 3), but designated "P" in FIG. 4, is approximately zero, and the time derivative of the error signal dE/dt is greater than a predetermined derivative error threshold $DE_{THLD}$ for the error signal, the algorithm exists the NORMAL state 107 and goes to the LIMIT CYCLE state 113. In other words, if the EGR valve 55 is moving when no change in the desired position "P" is being commanded, then the algorithm proceeds to the LIMIT CYCLE state 113. In the LIMIT CYCLE state 113, the compensator gain in the amplifier device 93 is reduced in an attempt to prevent (or eliminate) oscillation of the EGR valve 55. Typically, but not necessarily, this reduction in gain would be accomplished by using a look-up table of the type well known to those skilled in the art, to select a value for the gain, based upon the then-current value for dE/dt, the time derivative of the error signal 91.

While the algorithm 101 is in the Limit Cycle state 113, if the above-described condition (the time derivative dP/dt of the signal 81 being approximately zero and the time derivative dE/dt of the error signal 91 being greater than the error threshold $E_{THLD}$) ceases to be true, then the algorithm exits the LIMIT CYCLE state 113 and returns to the NORMAL state 107.

In accordance with an important aspect of the invention, the STICKING state 111 is that condition of the EGR valve system 23 in which the valve was commanded to move toward a particular open condition, but the fact that the error signal $E_N$ was greater than the threshold value $E_{THLD}$ (and for a time "t" greater than the threshold time value $T_{THLD}$) indicates that the command signal 95 was insufficient, in view of the then-current level of friction in the system to achieve the desired position "P" (signal 81 in FIG. 3) of the EGR valve 55.

When the algorithm is in the STICKING state 111, an instantaneous friction number is calculated (with the current or duty cycle DC required to change the position of the EGR valve 55 being representative of the instantaneous friction number). Then, in the STICKING STATE 111, the instantaneous friction number is compared to a reference friction number to generate a difference factor, threshold value $DC_{THLD}$ being representative of the reference friction number. The difference factor is then used to modify the compensator gain in the control device 93. For example, if the reference friction number were "10" and, after some period of operation of the engine, the friction number calculated while the algorithm 101 is in the STICKING STATE 111 would have a value of "13", that would indicate a thirty percent increase in the friction number, and the difference factor would be 1.30, indicating that the compensator gain would have to be decreased by about thirty percent (divided by a factor of about 1.3) in order to compensate for the increased level of friction in the system.

In actual practice of the invention, it would again be typical to provide a look-up table and, using the example above, the current value of the friction number (13) would be found in the look-up table to find the corresponding value for the compensator gain in the control device 93. In other words, the change to be made in the compensator gain may not be in a linear relationship with the changes in the friction number. In addition, the desired control of the EGR valve 55 may require other changes in the algorithm 101, and for example, the change in the friction number may also be used to select different coefficients for use in the pre-filter device 83, in order to reduce any overshoot of the position of the EGR valve 55.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A method of controlling the movement of an assembly in an internal combustion engine; said assembly including a control member being movable between a closed position, blocking communication from a first engine gas passage to a second engine gas passage, and an open position (FIG. 2); said assembly further including housing means, said control member being disposed within said housing means for reciprocable movement therein; an electromagnetic actuator operably associated with said housing means, and having an actuator output; a drive operable to transmit movement of said actuator output into reciprocating movement of said control member in response to changes in an electrical input signal, said method of controlling the movement comprising the steps of generating a compensator gain value to modify said electrical input signal, said method of controlling the movement being characterized by:

(a) providing a position sensor operable to sense a position of said control member and generate a position signal representing instantaneous control member position;

(b) storing a first relationship ($DC_{THLD}$) of said electrical input signal required to change said instantaneous control member position;

(c) during ongoing operation of said internal combustion engine, generating a then-current, second relationship (DC) of said electrical input signal required to change said instantaneous control member position;

(d) comparing said second relationship ($DC_{THLD}$) to said first relationship (DC) and generating a corresponding difference factor; and (e) using said difference factor to modify said compensator gain value correspondingly.

2. A method of controlling exhaust gas recirculation in an internal combustion engine, by means of an EGR valve assembly; said assembly including a valve member being movable between a closed position, blocking communication from an engine exhaust gas passage to an engine intake passage, and an open position (FIG. 2); said assembly further including housing means, said valve member being disposed within said housing means for reciprocable movement therein; an electromagnetic actuator operably associated with said housing means, and having an actuator output; a drive train operable to transmit movement of said actuator output into reciprocating movement of said valve member in response to changes in an electrical input signal, said method of controlling comprising the steps of generating a compensator gain value to modify said electrical input signal, said method of controlling being characterized by:

(a) providing a valve position sensor operable to sense a position of said valve member and generate a position signal representing instantaneous valve position;

(b) storing a first relationship ($DC_{THLD}$) of said electrical input signal required to change said instantaneous valve position;

(c) during ongoing operation of said internal combustion engine, generating a then-current, second relationship (DC) of said electrical input signal required to change said instantaneous valve position;

(d) comparing said second relationship (DC) to said first relationship ($DC_{THLD}$) and generating a corresponding difference factor; and (e) using said difference factor to modify said compensator gain value correspondingly.

* * * * *